2 Sheets—Sheet 1.

G. KRAETZER.
BEE-HIVE.

No. 190,874. Patented May 15, 1877.

Witnesses:
S. W. Seely
R. T. Dyer

Inventor:
Gottlieb Kraetzer

By Geo. W. Dyer & Co.
Attorneys

G. KRAETZER.
BEE-HIVE.

No. 190,874. Patented May 15, 1877.

Witnesses
S. W. Seely
R. T. Dyer

Inventor
Gottlieb Kraetzer
By Geo. W. Dyer & Co.
Attorneys

UNITED STATES PATENT OFFICE.

GOTTLIEB KRAETZER, OF SOUTH CHICAGO, ILLINOIS.

IMPROVEMENT IN BEE-HIVES.

Specification forming part of Letters Patent No. 190,874, dated May 15, 1877; application filed February 10, 1877.

*To all whom it may concern:*

Be it known that I, GOTTLIEB KRAETZER, of South Chicago, in the county of Cook and State of Illinois, have invented a new and Improved Bee-Hive, of which the following is a true and accurate description, reference being had to the accompanying drawings, in which—

Figure 1:
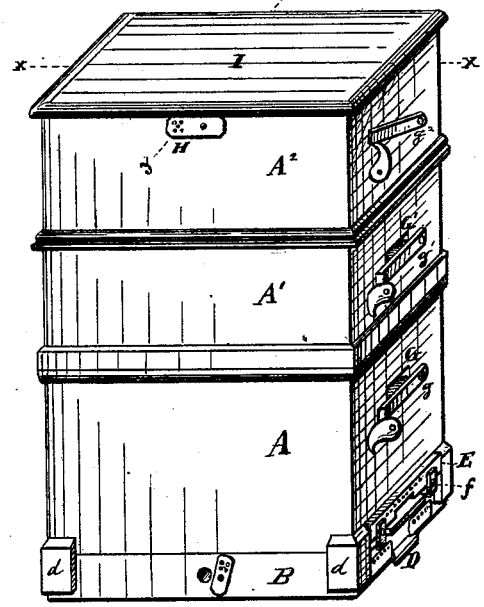
Figure 2:
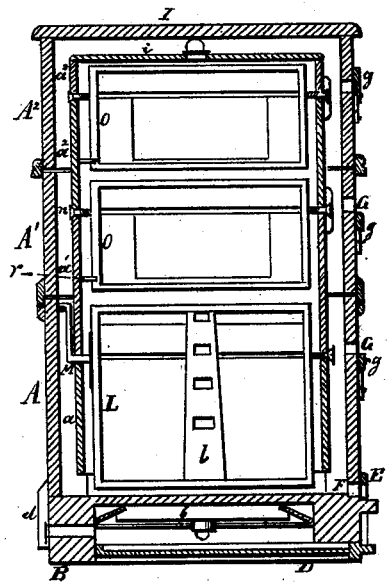
Figure 3:
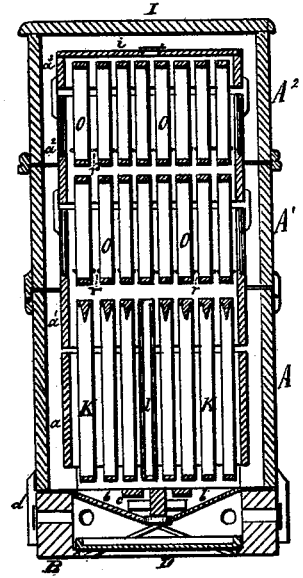
Figure 4:
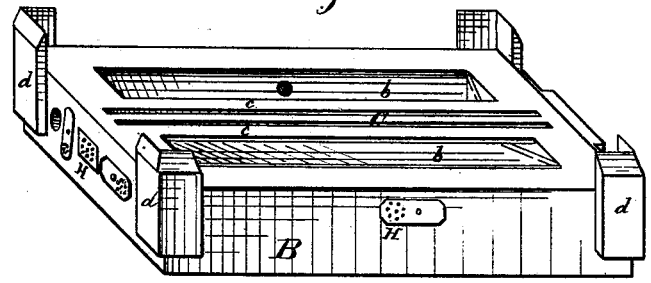

Figure 1, Sheet 1, represents an exterior perspective view; Fig. 2, Sheet 1, a longitudinal section on line $x\ x$ in Fig. 1; Fig. 3, Sheet 1, a cross-section on line $y\ y$ in Fig. 1; Fig. 4, Sheet 2, a perspective view of the moth's trap which forms the base or bottom of the hive; Figs. 5, 6, 7, and 8, Sheet 2, perspective views of the sectional honey-comb frames, and Fig. 9, Sheet 2, a perspective view of the main-entrance door.

The nature of my invention relates to that class of bee-hives known as the two and three-story hives, and which are provided with removable sectional honey-comb frames for the breeding-chamber as well as for the surplus honey-chambers; and my invention therein consists in the construction of the moth-trap, as fully hereinafter explained.

A is the exterior box-section of the breeding-chamber, and $A^1$ and $A^2$ of the surplus honey-chambers. The box-sections $A^1$ and $A^2$ are provided on their lower edges with sockets, which will admit the upper ends of the sections A and $A^1$, and will insure a weather-proof joint, and, all of these sections being of equal length and width, they will fit one to another and can be interchanged.

The breeding-chamber box-section A is provided with a bottom entrance, F, for the bees, which extends to near the whole width of the box, and which is decreased in its length by a door-plate, $f$, of a little more than the double width of the entrance F, being notched out on one side, so as to form the usual bee-hive-entrance size, and perforated with small holes on its opposite side. Said door-plate is placed in front of the entrance F, and is held in its place by a couple of cleats projecting from the moth's-trap frame, and it may be placed there with either side up, so as to afford an endwise-contracted entrance for the bees, or to close up the entrance, in which csse the perforations will keep up a sufficient ventilation.

Besides the main entrance, the box-section A has another entrance-hole, G, near to its upper edge, and the box-sections $A^1$ and $A^2$ have each an entrance-hole, G′, which can be closed each by a pivoted gate, $g$, adjusted by means of a small cam. The box-section $A^2$ on its upper edges has ventilating-holes H closed by pivoted and perforated plates. The top of the upper box-section is closed by a removable cover, I.

The breeding-chamber or box-section A may either be placed upon a common board or upon the moth's-trap frame B, where it is held by projecting angular cleats $d$, secured to the corners of said frame B.

The moth's trap, Fig. 4, consists of a rectangular frame, B, two of the opposite inward sides of which are grooved to hold the ends of two glass plates, $b$, slidden in from each side on an incline toward the center, and to the center of said frame is fixed longitudinally three stiles, C and $c\ c$, so as to be flush with the top of the frame and a little distance apart. The center stile C is thicker, and reaches nearly down to the lower edges of the glass plates $b$, and so that narrow open spaces are left between said glass plates and the stile C. Said frame B is provided on three sides with ventilating-holes H, covered each by a perforated pivoted plate. The bottom D of the moth's trap is arranged for sliding in and out.

A moth being in the hive, the bees will push it downward, where it must fall upon one of the inclined glass plates, $b$, and will slide down thereon until passing the lower edge of the glass, whence it cannot work upward again. By means of the slide D the trap can be cleaned of any refuse the bees may deposit.

The breeding-chamber box-section A has guiding-strips secured to its inner corners for holding the inner box-section $a$, which may be moved up and down therein. This section $a$ is of considerable less height than the outer box-section A, and does not reach to the moth's trap within half an inch. Its upper edges on two opposite ends are notched out to form seats for the honey-comb-frame supports at equal distance apart.

The inner box-sections $a^1$ and $a^2$ are of about equal height with the outer box-sections $A^1$ and A², are provided on their sides or corners with projecting cleats for holding one frame on top of the other, and are notched on the upper edges of two opposite sides, so as to form bearings for the supports of the sectional surplus honey-frames, while one side, at about middle height, has a series of projecting pins or studs, $r$, for spacing equal distance apart, and for steadying the lower ends of the sectional frames, one pair of said stud being intended for each frame.

A narrow box-section, $a^3$, will fit upon either one of the inner box-sections, and is closed on top by a removable cover, $i$, provided with a ventilating-hole, H, closed by a perforated pivoted plate.

The space between the inner and outer wall of the box-sections, and between the inner and outer cover is one-half inch, which is just enough space for a bee loaded with food to pass, and all the passages leading into the hive through the inner wall, which are at the joint between two box-sections, are of the same size, so that the bees will not do any pasting, as they will keep such passages open, and will have ample space for reaching the upper chambers of the hive from all sides. The double wall will facilitate a thorough ventilation; it will prevent the sun for melting the comb, and spoiling the honey; it will keep the bees warm and free from frost in the winter-time, on account of which the bees will consume less food, and will permit the hive to remain on the same stand the whole year around.

The construction and arrangement of the several box-sections will permit the use of a one-story hive by placing the narrow box-section $a^3$ upon the box-section $a$, when, if desirable, boxes may be placed on top for the bees to store the surplus honey in; or a two-story hive may be had by placing the narrow box-section $a^3$ upon the box-section $a^1$, which is of great advantage, since, commencing with a small stock of bees in a one-story hive, said hive may be changed into a two and three story hive as the stock of bees increases, and by affording them ample working room they will not be so apt to swarm.

Furthermore, by my arrangement the sun shining into the entrance in this hive will be felt as much, and will have the same influence upon the bees as in single-wall hives, since the light and reflection from the sun-rays will find its way through under the inner walls of the hive.

Figure 5:
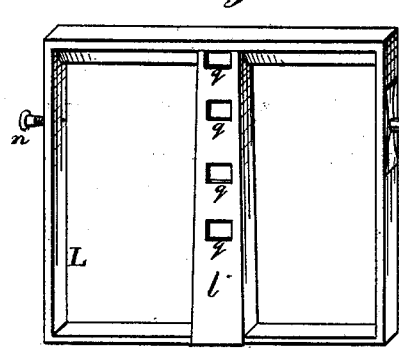
Figure 6:
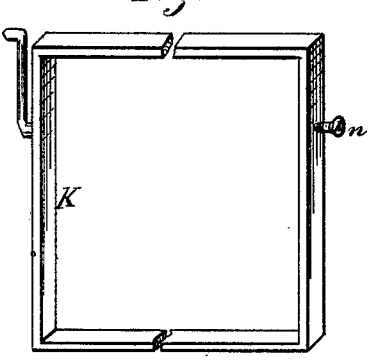

I use four styles of comb-frames in this hive. Figs. 5 and 6 represent the sectional frames for the breeding-chamber, and Figs. 7 and 8 the same for the surplus honey-chambers.

In Fig. 5, L is a frame of the usual width, and of a size sufficiently shorter endwise than the space between the inner walls of the hive, so as to allow the bees ample passage by its ends. The center of this frame is intersected by a ventilating-flue, $l$, open at the bottom, and perforated on its sides by a series of holes, $q$. One or two of these frames only are to be used for a hive. They are to be placed into about the center of the breeding-chamber, and so that the flue $l$ will be in line above one of the ventilating-spaces of the moth's trap, and are intended to assist ventilation toward the upper part of the breeding-chamber.

In Fig. 6, K is a plain frame, of same outside dimensions as frame L.

The sectional frames intended for the breeding-chamber are suspended from a point about one-third from the top, on one end, upon a common wood-screw, $n$, secured into the end slat of the sectional frame, and upon the opposite end upon a malleable-iron stud, M, projecting from a plate, $m^2$, which is secured to the end slat by two small wood-screws. From the end of the stud M projects a vertical arm, $m$, to about a line with the upper end of the sectional frame, where said arm ends into an outward-bent hook, $m^1$. The stud M is to rest in one of the notches on top edge of box-section $a$, while the hook $m^1$ is to be passed between two of a series of pins or studs projecting from the inside near the upper edge of box-section A.

This arrangement will insure an equal empty space between all of the sectional frames, besides holding the frames very steady, which all is of great advantage, since, if the frames would vibrate, the bees would paste them up, and if the space between the sectional frames would not be equal the bees could not work to advantage, and would be at fault in the spacing off of their cells.

Figure 7:
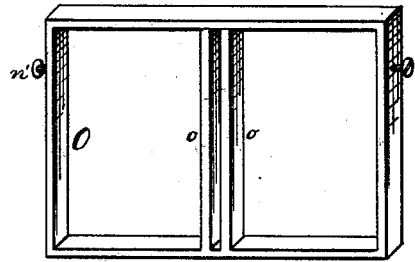
Figure 8:
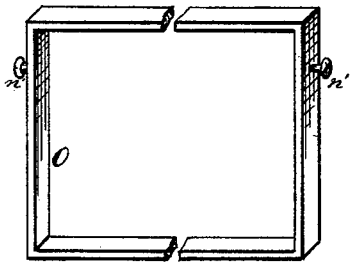
Figure 9:
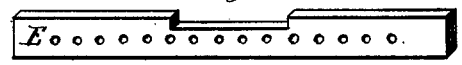

Figs. 7 and 8 are surplus honey-frames, which are of the same length endwise as the breeding-chamber frames.

In Fig. 7, O is a frame, the space in which in its center is intersected by a double partition into, $o$ $o$, for the purpose of enabling the grocer to sell honey in its natural comb in smaller quantities by cutting the frame between the two partitions. Fig. 8 is a common surplus honey-frame of same outside dimensions as Fig. 7.

These surplus honey-frames are supported each by two wood-screws, $n'$, secured into the ends of the frames the same distance from top as the breeding-chamber frame-supports. These wood-screws find a bearing in the notches provided on the top edges of box-sections $a^1$ and $a^2$, and their lower ends are held equal distance apart, each by two projecting pins or studs secured to about the center of the inside of one end of the box-section.

The peculiar device described herein of suspending the honey-comb frames has for its object, beside the exact spacing off already referred to, to enable the lifting out of the same straight, whereby no bees will be killed, that by having the point of suspension some distance below the top of the frame, in case that any one of the frames is out of square, such inequality will divide between both ends without diminishing the working-space of the bees too much at either end; that there are no parts for the bees to glue together, and, therefore, there will be nothing to tear apart by interchanging the frames; that the frames can be easily attached to a centrifugal machine for emptying the honey without destroying the combs, which may be replaced into the hive to save the bees the work of building new ones.

The surplus honey-frames being of such dimensions that they will fit into the places of the breeding-chamber frames, one of the upper frames may be put in place of one of the lower ones and left to remain there until after the bees have started their cells therein, when, by replacing it in one of the upper chambers, the bees are induced to commence working in the surplus honey-chamber much quicker than they otherwise would, while it is considered of great profit and advantage to compel the bees to work as much above as below in the hive.

The main points to be held in view in the construction of a bee-hive are the prevention of the access of the moths to the hive, and the separation of the portion containing the spare honey from the breeding portion. It is also desirable that perfect ventilation, as near as possible equal temperature, and ready access to any part of the hive, should be attained, and that there should be no difficulty in removing the surplus honey, all of which conditions are reached in the construction and arrangement of the above-described bee-hive.

The box-sections $a^1$ and $a^2$ have each glass plates inserted into their walls.

What I claim as my invention is—

The moth-trap for bee-hives, described, consisting of the frame B having the ventilating-holes H, the inclined glass plates $b\ b$ with a space between their lower edges, the sliding bottom D extending the whole length of the said frame, and the stiles C $c\ c$, all constructed and arranged substantially as described and shown.

GOTTLIEB KRAETZER.

Witnesses:
WM. H. LOTZ,
EMIL H. FROMMANN.